Patented Feb. 7, 1933

1,896,490

UNITED STATES PATENT OFFICE

ERNST KOMM, OF DRESDEN-WEISSER HIRSCH, GERMANY

PROCESS FOR THE TREATMENT OF WHEAT-GERMS

No Drawing.   Application filed May 24, 1928.  Serial No. 280,378.

The present invention has for its object a process for treating wheat-germs for the purpose of obtaining valuable nutrient products suitable for human nourishment in one procedure from the solid product resulting from the treatment mentioned as well as from the liquid extractive product.

Said result is obtained by mashing wheat-germs with water and by separating the mash-liquid from the solid constituents after the mashing procedure. The solid constituents are dried and the liquid constituents are concentrated by evaporation in a high-vacuum, in which procedure the bitter principles still present within the solid or liquid constituents are carried off by the water-steam or, in other words, removed from the product, so that the wheat-germs, i. e. their solid as well as their liquid constituents are worked up in one procedure to form products of a valuable concentration of nutrients.

The process can practically be performed in the following manner:

Wheat-germs are mixed with about a fourfold quantity of water of a temperature of approximately 55 to 65 degrees centigrade and kept at this temperature for about six hours whilst stirring said mixture. In this manner a great portion of the soluble constituents to which, first of all, belong the vitamines and vitasterines is extracted. At the same time, however, noxious products to which the peroxydase-ferments and bitter-principles (alkaloids and fatty acids) belong are removed by solution. The procedure has to be performed in such a manner that the completest possible exclusion of atmospheric air from the mash is obtained. After having finished the mash-process, the liquid phase is separated from the solid one by centrifuging, filtering or in other suitable manner. The main portion of the soluble constituents of the wheat-germs, in the first place the vitamines and vitasterines, is present in the liquid phase, whereas the nutrients not soluble in water, are, in the first place, contained in the solid phase. The activity of the ferments of the peroxydase is already destroyed. However, the bitter-principles of the wheat-germ are found to be distributed over or within the solid and liquid phases of the mash. They are removed from the solid mass by rapidly distilling off the water-residues adhering to it, so for instance preferably in a drying apparatus arranged with a drum heated by steam. The bitter-principles are removed from the liquid mass by concentrating the latter in a high vacuum at an utmost temperature of 40 degrees centigrade. The procedure of removing said noxious bitter-principles is in a chemical-technical sense equal to a distillation by steam. The solid mash substance is of an agreeable malt-like taste and contains a high concentration of nutrients; especially it is rich in valuable albumins and, therefore, well usable for human nutrition. The extractive substance is fully soluble in water and can, according to the required purpose, be obtained as a more or less concentrated sirop or as a solid, malt-like dry-product. The extract is characterized by a high proportion of vitamine or vitasterine and a high proportion of easily digestible nutrients, especially carbohydrates.

The mash-process can be performed without the least possible presence of atmospheric air, said absence of air being obtained by the mashing operation taking place in closed vessels in which the upper gas-space or room is filled with steam. Said upper gas-space can also be filled with carbon dioxide, said gas not being noxious to the activity of the vitamines and vitasterines. The carbon dioxide will, by its higher specific gravity, attempt to sink and, in consequence, will directly remain near the limiting-layer situated between the mash-liquid and the gas-space and close said liquid against the oxygen of the atmospheric air. In the procedure of distillation by steam, for instance in a drying plant arranged with a drum heated by steam, the product is fully enveloped by steam or water-vapors, so that a sufficient exclusion from the atmospheric air is obtained. Said vapors have no effect on the activity of the vitamines and vitasterines.

What I claim is:

1. A process for the treatment of wheat-germs, comprising mashing same with 400% of water in the absence of oxygen at 55–65° C. for six hours to thereby extract and preserve the vitamines and vitasterines, separating from the solid the liquid containing fatty-ingredients, vitamines, and vitasterines, drying the solid in such a manner as to remove the bitter principles, and concentrating the liquid.

2. A process for the treatment of wheat-germs, comprising mashing same with 400% of water in a high vacuum at 55–60° C. for six hours to thereby extract and preserve the vitamines and vitasterines, separating from the solid the liquid containing fatty-ingredients, vitamines, and vitasterines, drying the solid in such a manner as to remove the bitter principles, and concentrating the liquid.

3. A process for the treatment of wheat-germs, comprising mashing same with 400% of water in an atmosphere of steam at 55–65° C. for six hours to thereby extract and preserve the vitamines and vitasterines, separating from the solid the liquid containing fatty-ingredients, vitamines, and vitasterines, drying the solid in such a manner as to remove the bitter principles, and concentrating the liquid.

4. A process for the treatment of wheat-germs, comprising mashing same with 400% of water in an atmosphere of carbon dioxide at 55–65° C. for six hours to thereby extract and preserve the vitamines and vitasterines, separating from the solid the liquid containing fatty-ingredients, vitamines, and vitasterines, drying the solid in such a manner as to remove the bitter principles, and concentrating the liquid.

5. A process for the treatment of wheat-germs, comprising mashing same with 400% of water in the absence of oxygen at 55–65° C. for six hours to thereby extract and preserve the vitamines and vitasterines, separating from the solid the liquid containing fatty-ingredients, vitamines, and vitasterines, drying the solid in such a manner as to remove the bitter principles, and concentrating the liquid in a vacuum.

In testimony, that I claim the foregoing as my invention I have signed my name this 21st day of April, 1928.

ERNST KOMM.